(12) United States Patent
Fukuda

(10) Patent No.: US 8,362,968 B2
(45) Date of Patent: Jan. 29, 2013

(54) ARRAY ANTENNA, RADIO COMMUNICATION APPARATUS, AND ARRAY ANTENNA CONTROL METHOD

(75) Inventor: Junichi Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 12/528,147

(22) PCT Filed: Dec. 11, 2007

(86) PCT No.: PCT/JP2007/073844
§ 371 (c)(1),
(2), (4) Date: Aug. 21, 2009

(87) PCT Pub. No.: WO2008/105126
PCT Pub. Date: Sep. 4, 2008

(65) Prior Publication Data
US 2010/0117922 A1    May 13, 2010

(30) Foreign Application Priority Data
Feb. 28, 2007    (JP) .................................. 2007-050774

(51) Int. Cl.
*H01Q 3/24* (2006.01)
(52) U.S. Cl. .......................... 343/876; 343/702; 343/853
(58) Field of Classification Search .................. 343/702, 343/853, 876
See application file for complete search history.

(56) References Cited

U.S. PATENT DOCUMENTS

| | | | |
|---|---|---|---|
| 7,557,761 B2 * | 7/2009 | Iwai et al. ..................... | 343/702 |
| 8,098,756 B2 * | 1/2012 | Yamamoto et al. ............ | 375/267 |
| 8,144,060 B2 * | 3/2012 | Angell et al. .......... | 343/700 MS |
| 2005/0190110 A1 | 9/2005 | Taromaru et al. | |
| 2007/0040760 A1 | 2/2007 | Nagaev et al. | |
| 2008/0062049 A1 * | 3/2008 | Soler Castany et al. ...... | 343/702 |
| 2010/0127951 A1 * | 5/2010 | Robert et al. ................. | 343/876 |
| 2012/0046003 A1 * | 2/2012 | Ying ............................ | 455/90.2 |

FOREIGN PATENT DOCUMENTS

| | | |
|---|---|---|
| EP | 1501211 A | 1/2005 |
| JP | 2000252734 A | 9/2000 |
| JP | 2001024431 A | 1/2001 |
| JP | 2001036337 A | 2/2001 |
| JP | 2001345633 A | 12/2001 |
| JP | 2003258533 A | 9/2003 |
| JP | 2004140815 A | 5/2004 |
| JP | 2005136492 A | 5/2005 |
| JP | 2006033305 A | 2/2006 |

(Continued)

OTHER PUBLICATIONS

International Search Report for PCT/JP2007/073844 mailed Mar. 18, 2008.

(Continued)

*Primary Examiner* — Tho G Phan

(57) ABSTRACT

An array antenna includes a group of antenna elements and a switching section. The group of antenna elements has a configuration in which a plurality of antenna elements is arranged. The switching section has a plurality of switch elements capable of individually switching the feeding points of the antenna elements included in the group of antenna elements. By switching of the switch elements, the group of antenna elements is converted into an antenna for MIMO communication to transmit and receive a plurality of signals in parallel, or into a directional array antenna to control the directivity towards the direction at which the signals arrive.

19 Claims, 6 Drawing Sheets

FOREIGN PATENT DOCUMENTS

| | | |
|---|---|---|
| JP | 2006174095 A | 6/2006 |
| JP | 2006253818 A | 9/2006 |

OTHER PUBLICATIONS

R. F. Harrington, "Reactively Controlled Directive Arrays", IEEE Transactions on antennas and propagation. vol. AP-26, No. 3, May 1978, p. 390-395.

D. V. Thiel et al., "Switched Parasitic Antennas for Cellular Communications", Artech House, 2002, p. 144-153.

M. Wennstrom et al., "An Antenna Solution for MIMO Channels: The Switched Parasitic Antenna", 12th IEEE International Symposium on Personal, Indoor and Mobile Radio Communications, XP002623610, 2001, pp. A-159~163.

* cited by examiner

ARRAY ANTENNA, RADIO COMMUNICATION APPARATUS, AND ARRAY ANTENNA CONTROL METHOD

This application is the National Phase of PCT/JP2007/073844, filed Dec. 11, 2007, which claims a priority based on Japanese Patent Application No. 2007-050774 filed on Feb. 28, 2007, the entire contents of which are incorporated herein by reference.

TECHNICAL FIELD

The present invention relates to techniques of controlling an array antenna having a plurality of antenna elements.

BACKGROUND ART

Mobile communication terminal apparatus are required to communicate with base stations in many directions. The direction of a base station seen from a mobile communication terminal apparatus varies if the terminal apparatus moves. Because of that, a non-directional antenna is generally mounted on the mobile communication terminal apparatus. Non-directional antennas make it possible to have communications with the other party of any direction, but, in general, they underperform on communications in a direction towards which the directivity of directional antennas are turned. Recently, there has been a demand for improvement in communication performance, and techniques for that were developed and are now put to practical use.

For example, there is a technique of improving communication performance by controlling the directivity of a directional antenna towards the direction of arrival of signals.

In one configuration for directional antennas having controllable directivity, there is a plurality of antenna elements being arranged, and the phase and amplitude of a signal which is fed to each antenna element are controlled depending on antenna elements. The directivity of a directional antenna is given by the synthesis of radio waves emitted from each antenna element. Directivity control may be done by analogally or digitally controlling the amplitude and phase of a feeding signal. An ADC (Analog to Digital Converter) is used to digitalize feeding signals.

In another configuration for directional antennas having controllable directivity, the length of a non-radiation element of a Yagi-Uda antenna which has a radiation element and a plurality of non-radiation elements is varied electrically. See Reactive Controlled Directive Arrays (ROGERF. HARRINGTON) IEEE Transactions on antennas and propagation, vol. AP26, No. 3, May 1978, p 390-395 (Document 1).

Directional antennas described in Document 1 are configured in a manner in which non-radiation elements are arranged in a circular shape, with the radiation element at the center thereof. In order to control directivity, the reactance value of each non-radiation element is varied to thus change the length of an electrical element in each non-radiation element. By virtue of this, the directivity of the Yagi-Uda antenna may be optionally controlled. ESPAR antennas using this system are disclosed in Japanese Patent Application Publication No. 2001-024431 (Document 2).

In addition, there is a method which simplifies the configuration or the control by limiting the reactance value of non-radiation elements of the Yagi-Uda antenna having controllable directivity, as described above, to two states: an OPEN state and a SHORT state. See SWITCHED PARASITIC ANTENNAS FOR CELLULAR COMMUNICATIONS THIEL DAVID V. SMITH STEPHANIE/ARTECH HOUSE 2002 (Document 3). Antennas using this method are disclosed in Japanese Patent Application Publication No. 2001-36337 (Document 4), Japanese Patent Application Publication No. 2001-345633 (Document 5), and Japanese Patent Application Publication No. 2003-258533 (Document 6).

Furthermore, there are MIMO (Multi Input Multi Output) techniques that improve communication performance by transmitting/receiving signals via multiple antennas. In MIMO system, each antenna element is required to have little relationship with the others. A transmission apparatus transmits a plurality of data streams at the same time using a plurality of antenna elements. A receiving apparatus processes signals which were received by a plurality of antenna elements to thus recover the original plural data streams. This MIMO is an effective technique particularly under the multipath environment.

SUMMARY OF THE INVENTION

As mentioned above, the MINO method substantially improves communication performance in the multipath environment. However, in a line-of-sight environment, for example, where a high level signal comes from a certain direction, the effect of the MIMO method in improving communication performance is diminished.

Meanwhile, directional antennas that control the directivity towards the direction at which signals arrive are highly effective in improving communication performance in conditions where a high level signal comes from a certain direction. However, because the direction at which signals arrive is not defined as a single direction under the multipath environment, there are some cases in which directional antennas that control the directivity towards the direction at which signals arrive cannot achieve an effect equivalent to the MIMO method for improving communication performance.

In some cases, neither MIMO antennas nor directional antennas grant good communication performance under given environments to radio communication apparatus such as mobile communication terminal apparatus with varying environments.

An object of the present invention is therefore to provide an array antenna which can achieve good improvement in communication performance in varied environments such as a multipath environment, a line-of-sight environment, etc., a radio communication apparatus, and an array antenna control method.

To achieve the above object, an array antenna in accordance with one aspect of the present invention includes:

a group of antenna elements with a plurality of antenna elements being arranged; and a switching section, which has a plurality of switch elements capable of individually switching the feeding points of the antenna elements and which converts, by the switching of the switch elements, the group of the antenna elements to operate as an antenna for MIMO communication to transmit and receive a plurality of signals in parallel, or as a directional array antenna to control the directivity to the direction at which signals arrive.

A radio communication apparatus in accordance with one aspect of the present invention includes:

an array antenna which includes a group of antenna elements with a plurality of antenna elements being arranged, and a switching section which has a plurality of switch elements capable of individually switching the feeding points of the antenna elements and which converts, by switching of the switch elements, the group of the antenna elements to operate as an antenna for MIMO communication to transmit and receive a plurality of signals in parallel, or as a directional array antenna to control the directivity towards the direction at which signals arrive;

a feeding circuit which feeds power to the antenna elements that become radiation elements by switching of the switching section of the array antenna; and a control section which determines whether the array antenna should be used as a directional array antenna or as an antenna for MINO communication and instructs it to the array antenna.

An array antenna control method in accordance with one aspect of the present invention includes:

upon receiving a first request, employing an array antenna which includes a group of antenna elements with a plurality of antenna elements being arranged and a switching section which has a plurality of switch elements capable of individually switching the feeding points of the antenna elements, so as to set, by switching of the switch elements, the group of the antenna elements to operate as an antenna for MIMO communication, with the antenna transmitting/receiving a plurality of signals; and upon receiving a second request, setting, by switching of the switch elements, the group of the antenna elements to operate as a directional array antenna, with the antenna controlling the directivity towards the direction at which signals arrive.

DETAILED DESCRIPTION OF THE PREFERRED EMBODIMENTS

An exemplary embodiment of the present invention will be described in further detail with reference to the accompanying drawings.

Figure 1:
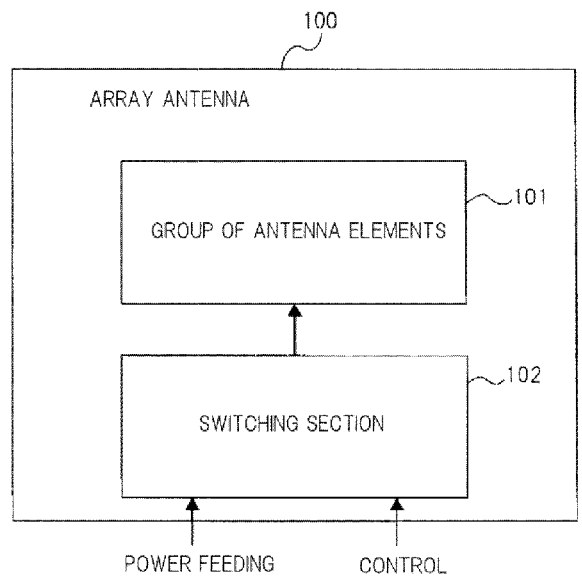
FIG. 1 is a block diagram showing a schematic configuration of an array antenna according to an exemplary embodiment of the present invention.

FIG. 1 is a block diagram showing a schematic configuration of an array antenna according to an exemplary embodiment of the present invention. Referring to FIG. 1, array antenna 100 includes group of antenna elements 101 and switching section 102.

Group of antenna elements 101 has a plurality of antenna elements. Each antenna element included in group of antenna elements 101 offers individual control over the state of a feeding point.

Switching section 102 switches the feeding points of the antenna elements included in group of antenna elements 101 such that group of antenna elements 101 is operated either as an antenna for MIMO communication which transmits/receives a plurality of signals in parallel or as a directional array antenna which controls the directivity towards the direction at which the signals arrive.

When group of antenna elements 101 acts as an antenna for MIMO communication, switching section 102 allows antenna elements for use in the transmission of a plurality of signals to be radiation elements, and feeds power to those feeding points.

When group of antenna elements 101 acts as a directional antenna, switching section 102 feeds power to the feeding point of an antenna element used as a radiation element, and puts the feeding points of antenna elements that are used as non-radiation elements into the OPEN state or the SHORT state which the elements short to the ground. Antenna elements in the SHORT state act as a reflector. However, antenna elements in the OPEN state act as a wave director. The directivity is determined depending on the arrangement of the reflector and the wave director.

According to this exemplary embodiment, since either one of two configurations, i.e. one configuration adopts the MIMO system to transmit a plurality of signals via antennas and the other configuration transmits signals by controlling the directivity of a directional array antenna to the direction at which the signals arrive, can be selectively used, it is possible to achieve good improvement in communication performance in varied environments such as a multipath environment, a line-of-sight environment, etc. As for communication performance, for example, real throughput, receiving sensitivity, or signal quality may be analyzed.

Figure 2:
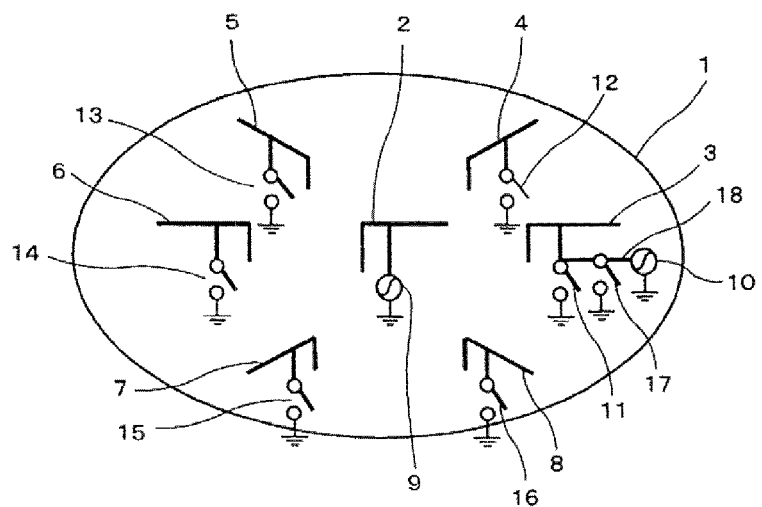
FIG. 2 is a mimetic diagram showing the array antenna according to the exemplary embodiment of the present invention.

FIG. 2 is a mimetic diagram showing the array antenna of this exemplary embodiment. In FIG. 2, inverted F-type antenna elements 2-8 correspond to antenna elements that constitute group of antenna elements 101 in FIG. 1. Switches 11-17 correspond to switches that constitute switching section 102 in FIG. 1.

An inverted F-type antenna element 2 (central antenna element) is arranged at the center on ground substrate 1. Inverted F-type antenna elements (peripheral antenna elements) 3-8 are arranged centering around inverted F-type antenna element 2, each being equally spaced from central antenna element 2 and being equally spaced apart from each other. Inverted F-type antenna element 2 receives power from feeding circuit 9 of a transceiver.

Inverted F-type antenna elements 3-8 are provided with switches 11-16, respectively. Depending on the state of switches 11-16, inverted F-type antenna elements 3-8 can be switched to two states: OPEN state and SHORT state with respect to ground substrate 1.

Moreover, inverted F-type antenna element 3 is configured to be able to be powered from feeding circuit 10 of the transceiver through microstrip line 18 and switch 17 besides switch 11. Inverted F-type antenna element 3 and switch 17 are connected by microstrip line 18, and the spacing between them is set to be a ¼ signal wavelength λ.

Next, the operation of the array antenna shown in FIG. 2 will be described.

When group of antenna elements 101 is employed as a directional array antenna, inverted F-type antenna element 2 at the center becomes a radiation element. And a non-radiation element is selected from its peripheral inverted F-type antenna elements 3-8. The directivity of the antenna is determined depending on which non-radiation element is selected. For instance, the directivity of the antenna is set by putting, among peripheral inverted F-type antenna elements 3-8, only a plurality of consecutively adjacent antenna elements in a certain direction, as seen from inverted F-type antenna element 2, into the OPEN state, and by putting the other antenna elements into the SHORT state.

As for the array antenna of FIG. 2, its directivity can be controlled by putting inverted F-type antenna element 3-8 into the OPEN state or the SHORT state, depending on the state of switches 11-16.

By setting the switches that are connected to the inverted F-type antenna elements to the SHORT state, the inverted F-type antenna elements in the SHORT state act as a reflector. However, the inverted F-type antenna elements, where the switches connected thereto are set to the OPEN state, act as a wave director. For example, when switches 13-15 are set to the SHORT state and switches 11, 12 and 16 are set to the OPEN state, inverted F-type antenna elements 5-7 act as a wave director, while inverted F-type antenna elements 3, 4 and 8 act as a reflector. As a result, the directivity of the antenna of FIG. 2 is made in the direction where inverted F-type antenna element 6 is located.

According to this exemplary embodiment, as shown in FIG. 2, inverted F-type antenna elements 3-8, which are non-radiation elements, are arranged in a circular shape centering around inverted F-type antenna element 2 which is a radiation element, so that when array antenna 100 is used as a directional array antenna, it becomes possible to make its directivity turn to any direction.

An array antenna having a controllable directivity may be configured in a manner that a plurality of antennas is arranged, and that phase and amplitude of signals for feeding power to each element are controlled. However, because both phase and amplitude of signals being fed to each element should be controlled, the control itself becomes complicated and power consumption increases as every element needs to be powered. In this regard, as in this exemplary embodiment, non-radiation elements are arranged in a circular shape with the radiation element as the center and the reactance value of each non-radiation element is varied, so that, in case of a directional array antenna having controllable directivity, only the radiation element is powered, and thus power consumption is suppressed that much.

In addition, according to this exemplary embodiment, inverted F-type antenna elements 3-8 are arranged with an equal spacing from inverted F-type antenna element 2 at the center and with an equal spacing from each other, so that, in case of using array antenna 100 as a directional array antenna, a directivity having almost the same gain in any direction can be formed.

Moreover, according to this exemplary embodiment, inverted F-type antennas are used as antenna elements to constitute group of antenna elements 101. Thus, compared with the case where dipole antennas or monopole antennas are employed, a relatively low profile can be realized, and, compared with the case where patch antennas are employed, good reflection characteristics and good wideband characteristics can be attained.

Figure 3:
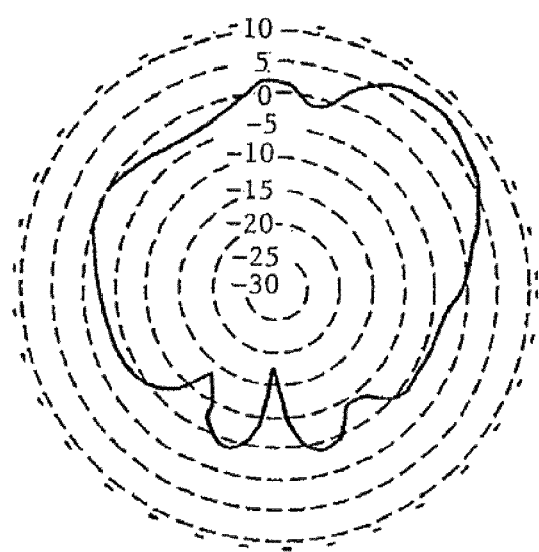
FIG. 3 is an illustration showing the pattern on a vertical plane in an example of a radiation pattern of the antenna according to the exemplary embodiment of the present invention.
Figure 4:
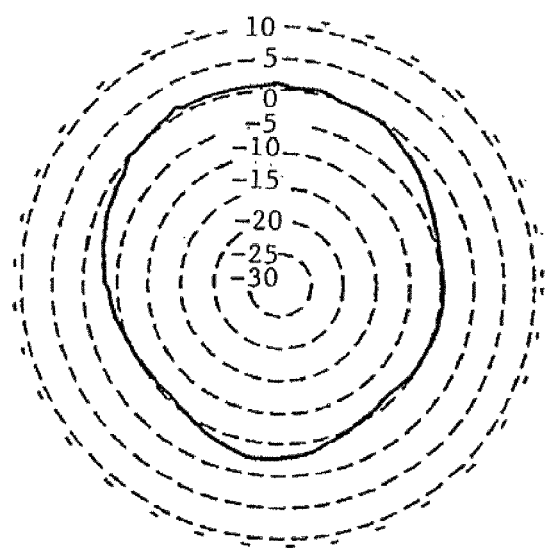
FIG. 4 is an illustration showing the pattern on a horizontal plane in an example of a radiation pattern of the antenna according to the exemplary embodiment of the present invention.

FIG. 3 and FIG. 4 show examples of a radiation pattern of the antenna according to this exemplary embodiment.

Figure 5:
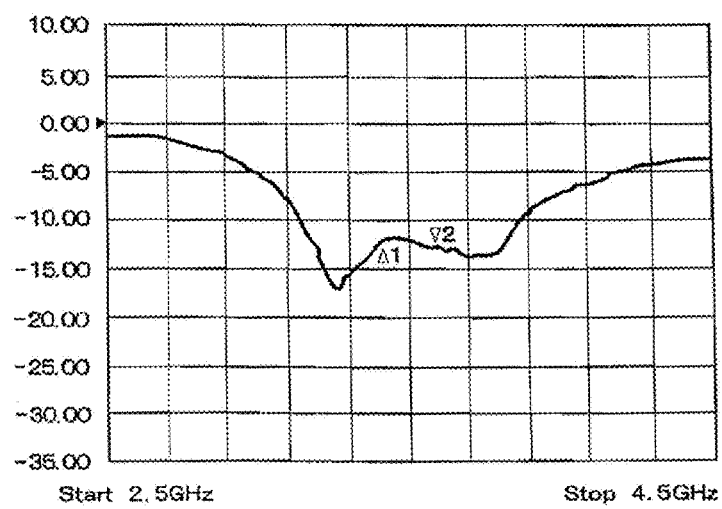
FIG. 5 is an illustration showing reflection characteristics of the antenna having the radiation patterns in FIG. 3 and FIG. 4.

FIG. 3 is a vertical plane's pattern out of the radiation pattern, and FIG. 4 is a horizontal plane's pattern out of the radiation pattern. Also, FIG. 5 shows reflection characteristics at this time. As shown in FIG. 3 and FIG. 4, the antenna has a directional beam pattern, and, at this time, an approximately 7.5 dBi peak gain was obtained.

The spacing between inverted F-type antenna element 2 and inverted F-type antenna elements 3-8 out of group of antenna elements 101 is set to a distance of an about ¼-½ signal wavelength. In this example, since sufficient reflection characteristics are obtained, the spacing is set to a distance of a ½ wavelength at 3.5 GHz. In conditions where a reflection characteristic is −10 db or less, 20% of specific bandwidth and wideband characteristics are attained from FIG. 4.

Figure 6:
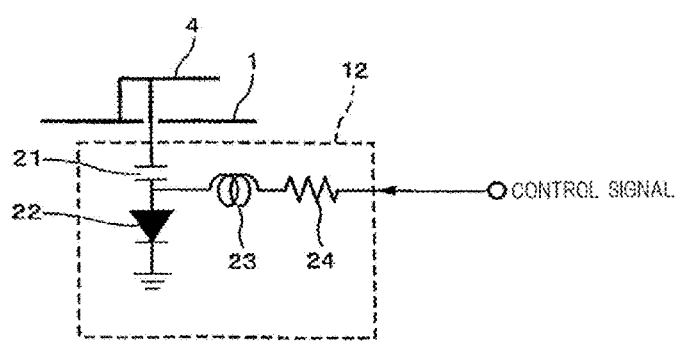
FIG. 6 is a circuit diagram showing a specific illustration of antenna switches 11-16.
Figure 7:
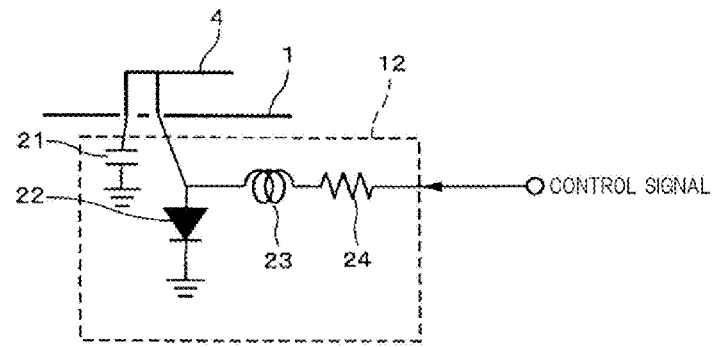
FIG. 7 is a circuit diagram showing another specific illustration of antenna switches 11-16.

FIG. 6 is a circuit diagram showing a specific illustration of antenna switches 11-16. In FIG. 6, pin diodes 22 for example are employed as the switches. By turning on or off pin diodes 22 by a control signal, pin diodes 22 may operate as a switch. Capacitor 21 is a DC cut capacitor. Coil 23 is a radio frequency cut coil. Resistor 24 is a bias-current-setting resistor.

Although in FIG. 6 DC cut capacitor 21 is connected to pin diode 22, if it is affected by a reactance component of capacitor 21, capacitor 21 may be connected to the short terminal side of inverted F-type antenna element 4.

Figure 8:
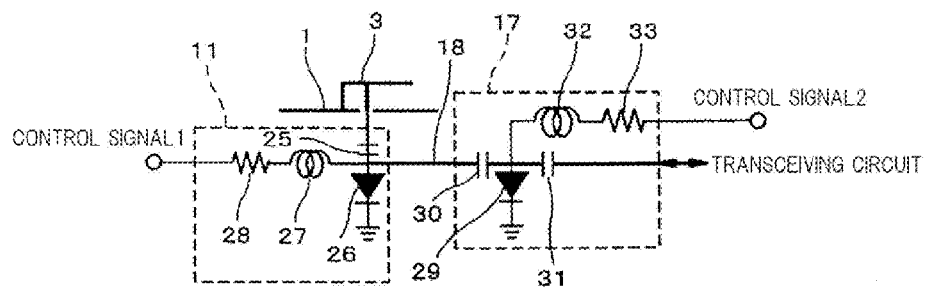
FIG. 8 is a circuit diagram showing a specific illustration of switch 17.

FIG. 8 is a circuit diagram showing a specific illustration of switch 17. Inverted F-type antenna element 3 and pin diode 29 are connected by microstrip line 18. The spacing between inverted F-type antenna element 3 and pin diode 29 is set to a distance of a ¼ signal wavelength λ. On account of this, when pin diode 29 is caused to short out, it seems open at a high frequency from the terminal of inverted F-type antenna element 3.

When inverted F-type antenna element 3 is put into the OPEN state or the SHORT state to ground by switch 11, switch 17 is set to the SHORT state.

Furthermore, when transceiving circuit (feeding circuit 10) is connected to inverted F-type antenna element 3, pin diode 26 of switch 11 and pin diode 29 of switch 17 are both set to the OPEN state. In this state, array antenna 100 can be used as a 2-port MIMO antenna of feeding circuit 9 and feeding circuit 10.

Meanwhile, even though pin diodes are employed as switch elements in this exemplary embodiment, GaAs switches, MEMS (Micro Electro Mechanical Systems) switches, etc., may also be used.

Next, another exemplary embodiment of the present invention will be described.

When array antenna 100 is used as a MIMO antenna, in addition to inverted F-type antenna 3, one of inverted F-type antenna elements 4-8 may have the same configuration as that of inverted F-type antenna 3.

Figure 9:
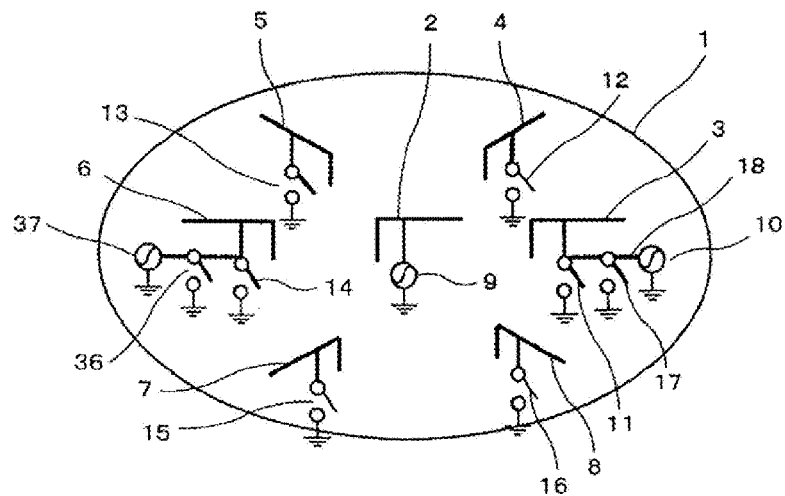
FIG. 9 is one example of a configuration which enables an array antenna to be used as a 3-port MIMO antenna.

FIG. 9 is one example of a configuration which enables an array antenna to be used as a 3-port MIMO antenna. In FIG. 9, array antenna 100 has a configuration, in addition to the configuration of FIG. 2, in which inverted F antenna 6 can be powered from feeding circuit 37 of a transceiver. Array antenna 100 can be used as a 3-port MIMO antenna, by employing feeding circuits 9, 10 and 37. In addition, when array antenna 100 is used as a MIMO antenna to make the radiation pattern of the MIMO antenna symmetric, feeding circuit 10 may be used with feeding circuit 37, not with feeding circuit 9.

Figure 10:
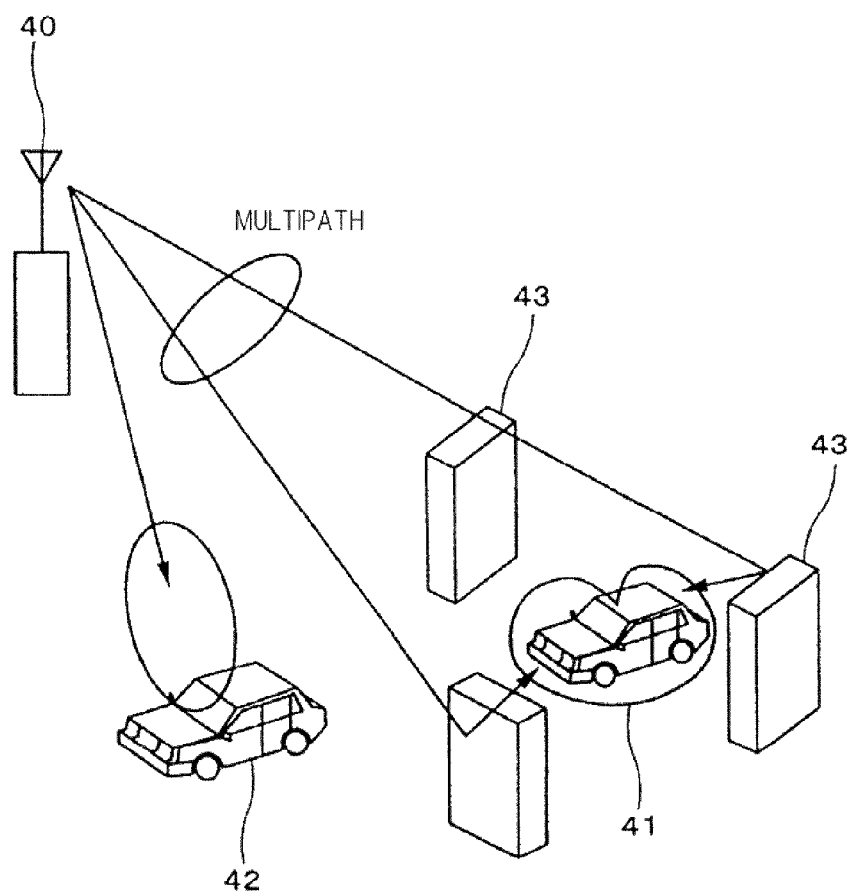
FIG. 10 is an illustration showing an example of conversion between a directional array antenna and a MIMO antenna.

FIG. 10 is an illustration showing an example of conversion between a directional array antenna and a MIMO antenna.

It shows a state, in which terminal 41 is in an open position from base station antenna 40. In this state, the intensity of received radio wave signals from base station antenna 40 is strong particularly from one direction.

It also shows that terminal 42 is in a multipath environment, in a non-open position from base station antenna 40. There is building 43 that is an obstacle between base station antenna 40 and terminal 42, and a transmitted wave is transmitted from base station antenna 40 arrive at terminal 42 through multiple paths.

In general, the MIMO method is highly effective for improving communication performance in multipath environments such as the conditions for terminal 41 is in, but its effect is rather small in environments without multipath as in the conditions for terminal 42, or in environments where there is a multipath but an incoming wave from a single direction has a particularly high intensity. Here, under the conditions for terminal 42, communication performance can be further improved by employing array antenna 100 as a directional array antenna and thus increasing the receive gain, rather than adopting the MIMO method.

Therefore, array antenna 100 is operated as a MIMO antenna under the conditions for terminal 41, while array antenna 100 is operated as a directional array antenna under the conditions for terminal 42. Accordingly, good communication performance such as receiving characteristics can be demonstrated in any of the environments for terminals 41 and 42. For instance, as one way to select a mode, real throughput may be measured for both the MIMO antenna and the directional array antenna, and whichever side that has a better throughput is going to be selected.

Also, the following will now explain the conversion operation which takes place when terminal with array antenna 100 described above has moved. Suppose that terminal receives a transmitted wave from base station antenna 40, while moving from the position of terminal 41 to the position of terminal 42.

Thus, array antenna 100 is operated as an MIMO antenna in the position of terminal 41, and if terminal moves to the position of terminal 42 array antenna 100 is converted to a directional array antenna. In this way, good communication performance can be retained in any of the environments for terminals 41 and 42.

Here, in order to decide whether to carry out the conversion, the receiving sensitivity or the signal quality of a terminal may be measured and compared with a given threshold.

Furthermore, when the terminal moves as shown in FIG. 10, a signal processing section (not shown) of the terminal makes the above-described decision, and then the conversion between a MIMO antenna and a directional array antenna may be carried out adaptively.

The above only illustrates a case where the terminal has moved, but there are some other cases where the environment of a terminal changes anyway even if the terminal has been installed in stationary manner. In the case of the latter, communication performance can be improved through conversion between the MIMO antenna and the directional array antenna. For instance, although a terminal may be installed as a stationary one, the environment of the terminal still changes when an obstacle is removed.

In addition, even if it is a terminal installed indoors, the terminal could be installed by the window to be seen from the base station antenna, or the terminal could be installed in a position that is not seen from the base station antenna. In the case of the latter, communication performance may still be improved by selecting a suitable one between the MIMO antenna and the directional array antenna. When the intensity of incoming radio wave signals from one direction is high, it is better to cause the array antenna to operate as a directional antenna. In environments having a lot of multipath such as over-the-horizon, it is better to cause the array antenna to operate as a MIMO antenna.

Figure 11:
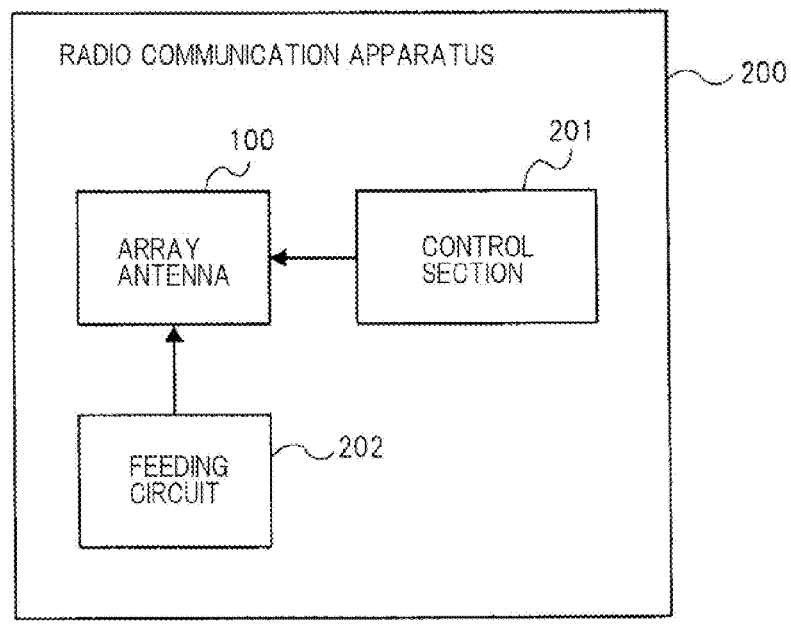
FIG. 11 is a block diagram showing a configuration of a radio communication apparatus with an array antenna that can be converted into a directional array antenna and to a MIMO antenna.

FIG. 11 is a block diagram showing a configuration of a radio communication apparatus with an array antenna that can be converted into a directional array antenna and to a MIMO antenna. Referring to FIG. 11, radio communication apparatus 200 includes array antenna 100, control section 201 and feeding circuit 202.

Array antenna 100 includes group of antenna elements 101, similar to the array antenna shown in FIG. 1 and FIG. 2, which consists of a plurality of antenna elements. Array antenna 100 is operated as a MIMO antenna or as a directional array antenna, as the feeding points of the antenna elements included in group of antenna elements 101 are switched individually under instruction from control section 201.

When array antenna 100 is employed as a directional array antenna or as a MIMO antenna, feeding circuit 202 feeds power to antenna elements which become radiation elements by switching of switching section 102 within array antenna 100.

Control section 201 determines whether array antenna 100 should be used as a directional array antenna or as a MIMO antenna, and instructs the determination result to array antenna 100. For example, control section 201 calculates the receiving sensitivity or signal quality and compares it with a given threshold to make a decision on the conversion. Also, control section 201 controls each of the switch elements in switching section 102 to allow array antenna 100 to go through the conversion.

So far, while the present invention has been explained with reference to exemplary embodiments, it is not limited to the above embodiments. Various modifications that are well understood by those skilled in the art can be made to the construction or particulars of the present invention defined in claims within the scope of the invention.

The invention claimed is:

1. An array antenna, comprising:
    a group of antenna elements with a plurality of antenna elements being arranged; and
    a switching section, which has a plurality of switch elements capable of individually switching the feeding points of the antenna elements and which switches, by the switching of the switch elements, the group of the antenna elements to operate as an antenna for Multi Input Multi Output (MIMO) communication to transmit and receive a plurality of signals in parallel, or as a directional array antenna to control the directivity towards the direction at which signals arrive;
    wherein the plural antenna elements of the group of antenna elements are arranged in a manner in which one antenna element which becomes a radiation element when the array antenna is used as the directional array antenna is disposed at the center, and in which peripheral antenna elements which become plural non-radiation elements are equally spaced away from the central antenna element at the center and equally spaced apart from each other.

2. The array antenna according to claim 1, wherein when the group of antenna elements is operated as the antenna for MIMO communication, the switching section performs switching to allow the antenna elements that are used for transmitting a plurality of signals to be radiation elements, and to feed power to feeding points thereof.

3. The array antenna according to claim 1, wherein when the group of antenna elements is operated as the directional antenna, the switching section feeds power to the feeding point of an antenna element used as a radiation element, and puts the feeding points of antenna elements that are used as non-radiation elements into an OPEN state or a SHORT state to ground.

4. The array antenna according to claim 1, wherein when the group of antenna elements is operated as the directional array antenna, the directivity is set by having the switching section feed power only to the antenna element at the center and put a plurality of consecutively adjacent antenna elements in a certain direction as seen from the antenna element at the center into the OPEN state while put the other antenna elements into the SHORT state to ground.

5. The array antenna according to claim 4, wherein, among the peripheral antenna elements, the antenna elements in the OPEN state and the antenna elements in the SHORT state to ground are varied so as to control a direction of the directivity.

6. The array antenna according to claim 1, wherein when the group of antenna elements is operated as the antenna for MIMO communication, the switching section allows a plurality of the peripheral antenna elements to be radiation elements.

7. The array antenna according to claim 6, wherein when the group of antenna elements is operated as the antenna for MIMO communication, the switching section makes two of the antenna elements which are in an inverted orientation as seen from the antenna element at the center to be radiation elements.

8. The array antenna according to claim 1, wherein the antenna elements in the group of antenna elements are inverted F-type antennas.

9. The array antenna according to claim 1, wherein pin diodes, GaAs switches or MEMS switches are used as the switch elements.

10. A radio communication apparatus, comprising:
an array antenna which includes a group of antenna elements with a plurality of antenna elements being arranged, and a switching section which has a plurality of switch elements capable of individually switching the feeding points of the antenna elements and which converts, by switching of the switch elements, the group of the antenna elements to operate as an antenna for Multi Input Multi Output (MIMO) communication to transmit and receive a plurality of signals in parallel, or as a directional array antenna to control the directivity towards the direction at which signals arrive;
a feeding circuit which feeds power to the antenna elements that become radiation elements by switching of the switching section of the array antenna; and
a control section which determines whether the array antenna should be used as a directional array antenna or as an antenna for MINO communication and instructs the determination result to the array antenna;
wherein the plural antenna elements of the group of antenna elements are arranged in a manner in which one antenna element which becomes a radiation element when the array antenna is used as the directional array antenna is disposed at the center, and peripheral antenna elements which become plural non-radiation elements are equally spaced away from the central antenna element at the center and are equally spaced apart from each other.

11. The radio communication apparatus according to claim 10, wherein when the group of antenna elements is operated as the antenna for MIMO communication, under an instruction from the control section the switching section performs switching to allow the antenna elements that are used for transmitting a plurality of signals to be radiation elements, and to feed power to feeding points thereof.

12. The radio communication apparatus according to claim 10, wherein when the group of antenna elements is operated as the directional antenna, under an instruction from the control section, the switching section feeds power to the feeding point of an antenna element used as a radiation element, and puts the feeding points of antenna elements that are used as non-radiation elements into an OPEN state or a SHORT state to ground.

13. The radio communication apparatus according to claim 10, wherein when the group of antenna elements is operated as the directional array antenna, the directivity is set by having, under an instruction from the control section, the switching section feed power only to the antenna element at the center and put a plurality of consecutively adjacent antenna elements in a certain direction as seen from the antenna element at the center into the OPEN state while putting the other antenna elements into the SHORT state to ground.

14. The radio communication apparatus according to claim 13, wherein, among the peripheral antenna elements, the antenna elements in the OPEN state and the antenna elements in the SHORT state to ground are varied so as to control a direction of the directivity.

15. The radio communication apparatus according to claim 10, wherein when the group of antenna elements is operated as the antenna for MIMO communication, under an instruction from the control section, the switching section makes a plurality of the peripheral antenna elements to be radiation elements.

16. The radio communication apparatus according to claim 15, wherein when the group of antenna elements is operated as the antenna for MIMO communication, under an instruction from the control section the switching section allows two of the antenna elements which are in an inverted orientation as seen from the antenna element at the center to be radiation elements.

17. The radio communication apparatus according to claim 10, wherein the antenna elements in the group of antenna elements are inverted F-type antennas.

18. The radio communication apparatus according to claim 10, wherein pin diodes, GaAs switches or MEMS switches are used as the switch elements.

19. An array antenna control method, comprising:
upon receiving a first request, employing an array antenna which includes a group of antenna elements with a plurality of antenna elements being arranged and a switching section which has a plurality of switch elements capable of individually switching the feeding points of the antenna elements, so as to set, by switching of the switch elements, the group of the antenna elements to operate as an antenna for Multi Input Multi Output (MIMO) communication, with the antenna transmitting/receiving a plurality of signals; and
upon receiving a second request, setting, by switching of the switch elements, the group of the antenna elements to operate as a directional array antenna, with the antenna controlling the directivity towards the direction at which signals arrive;
wherein the plural antenna elements of the group of antenna elements are arranged in a manner in which one antenna element which becomes a radiation element when the array antenna is used as the directional array antenna is disposed at the center, and peripheral antenna elements which become plural non-radiation elements are equally spaced away from the central antenna element at the center and are equally spaced apart from each other.

* * * * *